July 14, 1970  V. G. SEVERIN ET AL  3,520,074
INSTRUCTION SYSTEM PROVIDING PERMANENT RECORDS
Filed Oct. 4, 1967  2 Sheets-Sheet 1

Inventors:
Victor G. Severin
Leonard J. Kobek
By
Dawson, Tilton, Fallon & Lungmus
Attys.

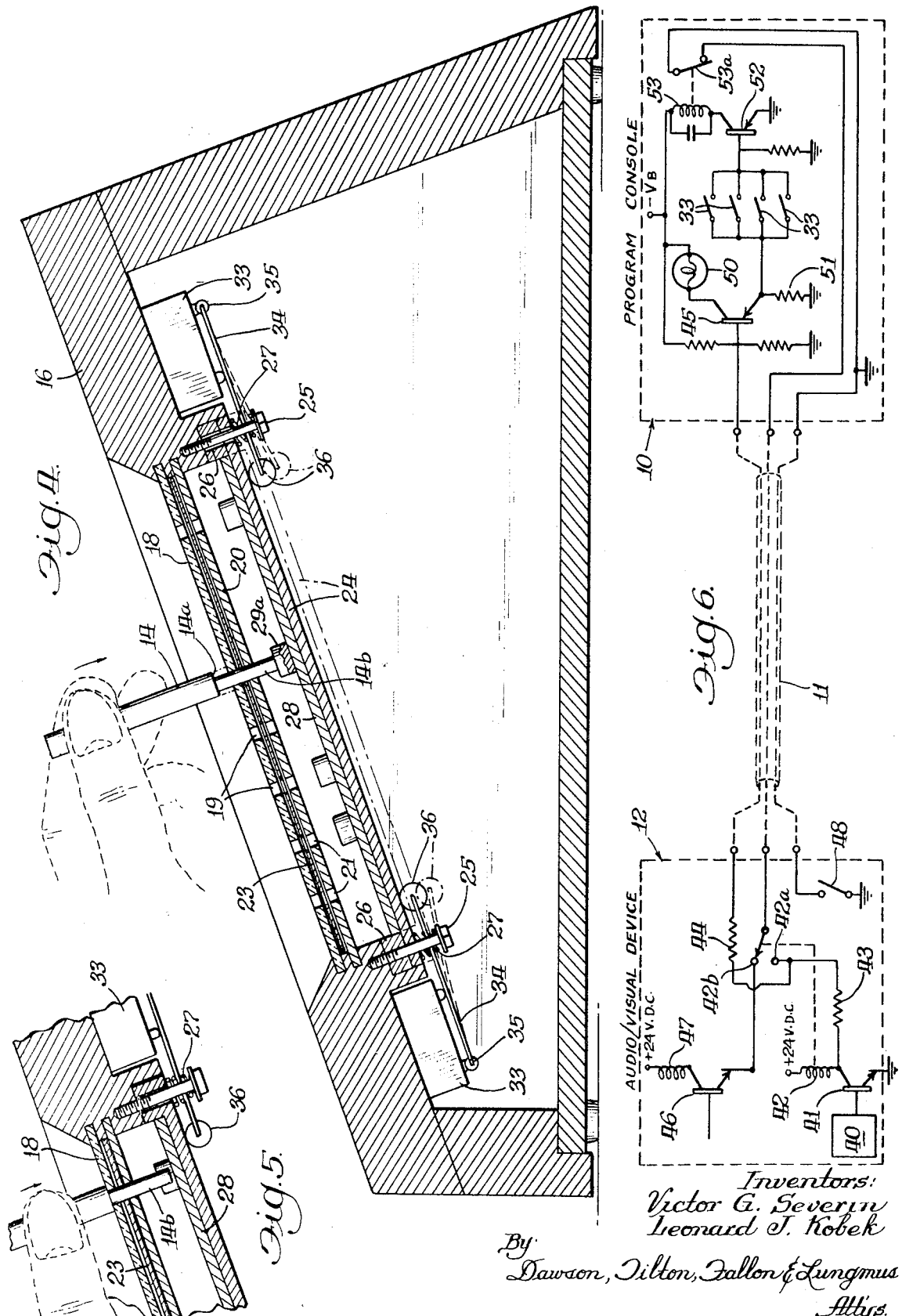

United States Patent Office 3,520,074
Patented July 14, 1970

---

3,520,074
INSTRUCTION SYSTEM PROVIDING PERMANENT RECORDS
Victor G. Severin, Arlington Heights, and Leonard J. Kobek, Chicago, Ill., assignors to Instruction Systems, Inc., Chicago, Ill., a corporation of Illinois
Filed Oct. 4, 1967, Ser. No. 672,878
Int. Cl. G09b 7/06
U.S. Cl. 35—48         1 Claim

ABSTRACT OF THE DISCLOSURE

A student's console is combined with a programed audio/visual device to provide an instructional system. An answer record is inserted in the console between a clear faceplate panel and an opaque underpanel, each of which define a matrix of apertures in register with selected locations on the answer record indicative of answers to questions. Answers are permanently recorded when a student inserts a stylus through corresponding aligned apertures which guide the stylus in perforating the answer record. A program board, resiliently moutned beneath the opaque underpanel, is provided with risers at those loctaions representing correct answers. Deflection of the program board generates a signal to restart the audio/visual device. In addition to the regular "answer" locations, a "restart" location is included for restarting the audio/visual device when a task, as distinguished from an answer, is indicated.

BACKGROUND

The present invention relates to a teaching machine, or auto-instructional device, designed primarily for commercial and industrial use in training employees, etc. More particularly, it relates to such a device wherein a permanent record of achievement or test scores is provided.

Industrial teaching machines are known, and, in general, they are centered about an audio/visual device which projects slides or frames from a film strip upon a screen as controlled by a magnetic tape which, aside from storing the control signals for the projector, contain the audio or speech record which provides the instruction to an observer or student. The visual information appearing on the screen illustrates and reinforces the verbal instruction on the tape.

The instruction is organized in relatively small increments which are commonly referred to as "frames." Each frame is intended to teach one segment of the total instruction, and it thus represents a single learning objective. The frame may be sequenced in groups, in which case each group in turn aims at a higher learning objective.

Ordinarily, each frame of instruction ends with either a question to the student which requires a correct answer before the instruction is continued, or an assignment to perform a task, such as copying information, referring to a manual, etc., or performing a physical act considered helpful in the learning process. Hence, after each frame, a signal recorded on the magnetic tape stops the audio/visual device in order to allow a student response. Typically, in the case of a question, there is also recorded on the tape a signal corresponding to the correct response; and the student must press a letter key representing the correct answer before the instruction will restart. If the frame had ended with an assigned task, instruction is resumed when the student presses a restart button.

When a response is incorrect, the audio/visual device will remain in a standby position, and a panel light will indicate that the student must reconsider his response and select another answer. The operation continues in this manner until the student has responded correctly to the question. Alternatively, an incorrect response may automatically rewind the magnetic tape to repeat the instruction a second time, or it may continue forward with comment included on the tape for further reinforcing the original frame. Uusually the correct choice will then be indicated and explained.

A major shortcoming of such machines is that they record either all correct responses made on the first attempt, or all incorrect responses made on the first attempt thus providing a cumulative "score." Except in some very elaborate and expensive teaching machines, a supervisor or instructor does not have a permanent record of the tests, and he cannot therefore identify those questions on which an incorrect first response was given. Further, he cannot known whether any questions were missed more than once.

A permanent record indicating questions which have been missed is desirable for several reasons. First, it would allow immediate review with a supervisor of those areas in which the student incorrectly responded. Secondly, the supervisor would have a record of all missed questions for a number of students, and these could reveal areas in which the instruction itself is weak. That is, if a higher than normal number missed a specific question, this might be an indication that either the question is worded vaguely or the instruction needs reinforcing. Further, in those systems in which the audio/visual device simply remains in a standby condition until a correct answer is given, a reviewer has no indication of those areas which need reinforcement.

In addition, these prior systems have in general intended to be very complex, requiring up to six different response signals in most cases of multiple choice questions, including a restart signal. Each of these signals must have a decoder at the audio/visual device for restarting the device upon proper response.

SUMMARY OF THE INVENTION

The present invention employs a conventional audio/visual device which is programed to provide instruction. When a frame is completed, the audio/visual device sends out a signal which energizes a console. A light on the console is energized for signaling to the student that a response or task is required of him. The student is provided with a stylus for perforating or puncturing a cardboard sheet which fits between a clear faceplate panel and a lower opaque underpanel. Each of these panels defines a matrix of apertures which are aligned for guiding the stylus through the record or card.

When a correct answer is scored, the stylus engages a program board and deflects it. The console, in response to this movement of the program board, generates a signal which is fed back to the audio/visual device indicating a correct answer and therefore allowing the instruction to continue. At the same time, the console light is deenergized.

Thus, not only is there provided a permanent record of a student's performance in which his answers are correlated with specific questions; but, in addition, an instructor can readily see those questions on which a multiple error was made, indicating the need for additional instruction.

Further, the console of the instant invention is modular in the sense that it can be disassociated from one audio/visual device and used with another. At the same time, since most of these audio/visual devices are relatively expensive, the audio/visual device itself has further flexibility in that it can be used with a number of such users, or even for different purposes.

In addition, since the console is separable from any particular audio/visual device, it may easily be adapted for use with other existing audio/visual equipment.

Other advantages and features of the instant invention will be obvious to persons skilled in the art from the following detailed description of a preferred embodiment accompanied by the attached drawing wherein identical reference numerals will refer to like parts in the various views.

THE DRAWING

FIG. 4 is a transverse section view of the console of FIG. 2 illustrating the recording of a correct answer;

FIG. 5 is a detailed view showing the recording of an incorrect answer;

FIG. 6 is a circuit schematic diagram of control circuitry according to the instant invention.

DETAILED DESCRIPTION

Figure 1:
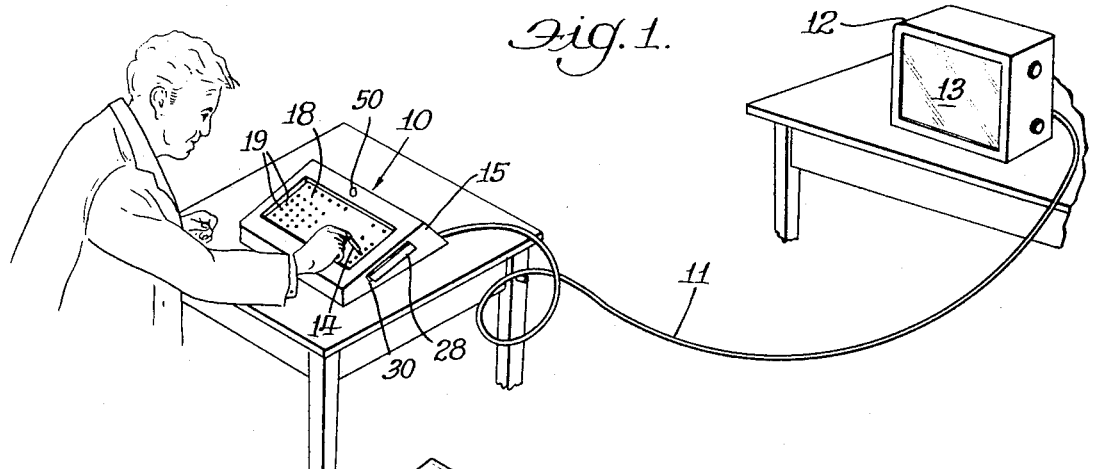
FIG. 1 illustrates the teaching system of the instant invention in use.

Referring then to FIG. 1, the system of the present invention is seen in its preferred usage. Typically, a student will be located at a program console, generally designated 10 which is electrically connected by means of a cable 11 to an audio/visual device which is generally designated 12. Answers are recorded by means of a stylus or probe 14.

As has already been mentioned, the console of the instant invention is easily adapted for use with any number of conventional audio/visual devices; however, a preferred audio/visual device is the Execugraf Model No. 640, manufactured by Argus, Inc., Niles, Ill. This particular model is equipped with a film strip which is projected on a screen (denoted by reference numeral 13 in FIG. 1) as controlled by signals recorded on one channel of a magnetic tape which also contains the audio or speech signal providing the instruction. Particular details of the output circuitry which coupled with the console 10 through cable 11 are provided in connection with the description accompanying FIG. 6.

Figure 2:
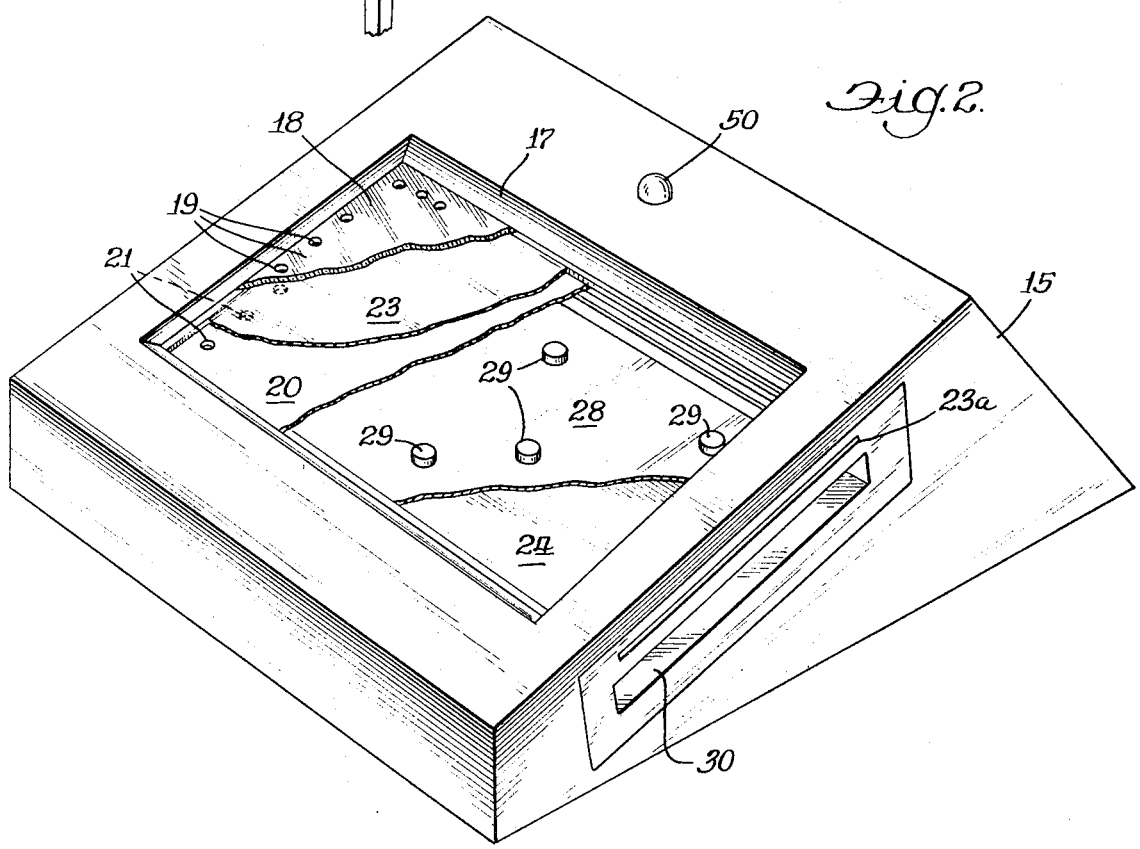
FIG. 2 is a perspective close-up view of the program console of the system of FIG. 1.
Figure 3:
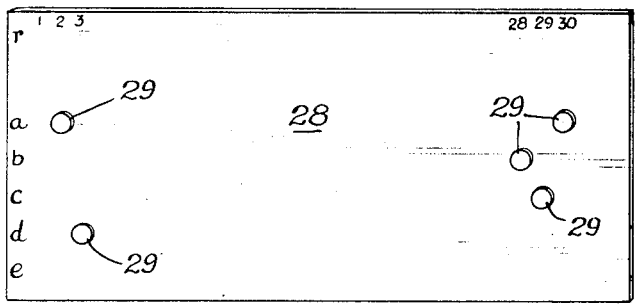
FIG. 3 illustrates the program board of the console of FIG. 2.

Referring now to FIGS. 2–4, the console will be described in more detail. The console 10 comprises a housing 15 provided with an inclined top panel 16 which is slanted to provide access for the student.

The top 16 of the console 10 defines a central recess 17 at the bottom of which there is mounted a faceplate panel 18 of clear, rigid plastic.

The clear faceplate panel 18 defines a matrix of apertures 19 which extend transverse of the plane of the faceplate panel 18.

Beneath the faceplate panel 18, and spaced therefrom at a distance sufficient to allow the insertion of an answer record, is an opaque underpanel 20 which also defines a matrix of apertures 21. The matrix of apertures 19 on the faceplate panel 18 are in register with the corresponding matrix of apertures 21 on the opaque underpanel 20; and corresponding upper and lower apertures define a guide for the insertion of the stylus 14, as is more clearly illustrated in FIGS. 4 and 5.

An answer record or "score" card 23 is inserted between the faceplate panel 18 and opaque underpanel 20 through a slot 23a on the side of the console (see FIG. 2). Hence, as the stylus 14 is projected through aligned apertures on the clear and opaque panels, it will also puncture or perforate the card 23 thereby permanently scoring it.

Located beneath the opaque underpanel 20 is a movable or deflectable activator panel 24 which is secured to the bottom side of the top panel 16 of the console by means of screws 25. Spacers 26 are attached to the upper surface of the activator panel 24 and separate it from the top panel 16 of the console, and coil springs 27 resiliently hold the activator panel 25 and spacers 26 against the lower surface of the top panel 16. Preferably, the activator panel 24 is mounted to the upper panel 16 of the console by means of four such bolt, spacer and coil spring arrangements.

The spacers 26 together with the activator panel 24 form a channel or receptacle beneath the opaque underpanel for receiving a program board 28.

The program board 28 (see in detail in FIG. 3) comprises a rigid board having a series of disc-shaped risers 29 attached to its upper surface at selected locations in line with the apertures 19 of faceplate panel 18 and apertures 21 of underpanel 20 for those specific locations which correspond to correct answers for the particular program. The top row on the program board 28 is reserved for a restart selection; and each column represents a separate question—the illustration shows a total possible 30 questions. It will be noted that the first question calls for a task so that the restart button must be depressed to reactivate the audio/visual device; for the second question, the correct answer is "a"; and for the third "d," and so on.

The program board is inserted into the receptacle defined by the spacers 26 and the activator panel 24 through a slot 30 in the side of the console beneath the slot 23a which receives the answer record. It will be noted that the program board is easily replaced; and this, of course, is necessary since every set of questions need not necessarily have the same set of answers or combination of questions and tasks.

Referring to FIG. 4, there are four small snap switches (two of which are shown and identified by reference numeral 33) mounted beneath the top panel 16 of console 10. Each of the switches 33 has a lever arm 34 which is pivotally connected at 35 to the body of the switch 33, and terminates in a roller 36 which engages the bottom surface of the activator panel 24. When the activator panel 24 is depressed against the force of the springs 27, the lever arms 34 of the switches 33 are rotated and the switches are closed.

This operation is illustrated in FIG. 4 in which the stylus 14 is seen to define a shoulder 14a and is provided with an elongated point 14b extending from shoulder 14a. When a correct answer is scored, the point 14b will puncture the answer record 23 and engage one of the risers (in this case 29a) on the program board 28; and this action will move the activator panel down to trip the switches 33, as seen in chain line in FIG. 4.

FIG. 5 shows the operation when an incorrect answer is scored—the point 14b of the stylus 14 does not engage a riser, and the shoulder 14a of the stylus inhibits its motion short of engaging the program board 28. Thus, there is no deflection of the activator panel 24, and a permanent record of an incorrect answer has been made.

ELECTRONIC CIRCUITRY

Turning now to FIG. 6, the console 10 is connected to the audio/visual device 12 by means of an interconnecting cable 11. The interface circuitry shown for the particular audio/visual device identified above comprises a TAPE STOP circuit and a FILM ADVANCE circuit. The block 40 schematically represents a conventional circuitry of the above-identified model which preceeds the TAPE STOP circuit, and forms no part of the present invention; it therefore will not be further discussed except to indicate that a pulse of duration 0.3 second is generated by the TAPE STOP circuit when the tape stops running. The TAPE STOP circuit comprises a transistor 41, the collector of which is coupled to the positive voltage supply, +24 v., DC, through a relay coil 42. The collector of the transistor 41 is also coupled through resistors 43 and 44, and the interconnecting cable 11 to the base of an input transistor 45 in the program console 10. The junction of the resistors 43 and 44 is connected to the normally-open contact 42a of the relay 42. A normally-closed contact 42b of the relay 42 is connected to the emitter of a transistor 46 which, together with a relay coil 47 form the FILM ADVANCE circuit. That is, when the transistor 46 is switched on (by circuitry not shown) the relay 47 will be energized to advance the film.

A switch 48 is provided in the audio/visual device 12 for grounding a second wire in the interconnecting cable 11. The moveable contact of the relay 42 is connected to a third wire in the interconnecting cable 11.

Turning now to the program console, a light 50 (the position of which is shown in FIG. 2 on the top panel 16 of the console) is connected in the collector circuit of the transistor 45. The emitter of the transistor 45 is connected to ground through a resistor 51, and the emitter is also connected to one side of the switches 33 which, as shown in FIG. 6, are all connected in parallel with normally-open contacts. The other side of the switches 33 are coupled in common to the base of a transistor 52, the collector circuit of which contains the coil of a relay 53. Normally closed contacts 53a of the relay 53 are connected across the second and third lines in the interconnecting cable 11.

OPERATION

When it is desired to use the equipment, the switch 48 is closed. When the tape is running in a normal condition, the transistor 41 is in an "off" condition so that the movable contact of the relay 42 is connected to contact 42b—thus providing a ground for the emitter of the transistor 46 (that is the FILM ADVANCE circuit) through the normally closed contact 53a of the relay 53 in the program console and the closed switch 48.

The circuitry 40 will generate a pulse to stop the tape and turn on transistor 41 thereby energizing coil 42; and the movable contact of the relay will switch to fixed contact 42a. This accomplishes two things: first, it interrupts the ground of the transistor 46 in the FILM ADVANCE circuit and thus prevents the film from advancing when the audio tape has stopped. Secondly, the bias current which had normally been supplied to bias the transistor 45 in an off condition is no longer present and resistor 54 biases the transistor 45 to an on condition. At the same time, the coil 42 is grounded through resistor 43, its contact 42a and through contacts 53a and switch 48 so that the coil 42 will remain energized even after the input pulse to transistor 41 is removed. This "on" condition of transistor 45 lights the light 50 and at the same time supplies a voltage ($-V_B$) to one side of the switches 33.

It will be appreciated prior to the stopping of the tape, no energy was supplied to the switches 33, and even if they had been closed, nothing would have happened since the transistor 45 was in an off condition and both sides of the switches 33 were at ground potential. Now, however, with the transistor 45 in an on condition, one side of the switches 33 (namely the side connected to the resistor 51 and emitter of the transistor 45) is energized. Hence, when the switches 33 are thus energized and any of them is closed, a negative potential will appear at the base of transistor 52 to turn it to an on condition, and the full supply voltage will appear across the coil of the relay 53 thereby opening contacts 53a. The ground on the relay 42 in the collector circuit of the TAPE STOP circuit is broken which de-energizes this relay. Even when the stylus is removed from the program board 28, and the relay contact 53 close again, the relay 42 will not thereafter energize until the transistor 41 is turned on again. It will also be noted that this action switches a movable contact of the relay 42 to contact 42b and turns out the light 50 in the program console as the relay 42 is de-energized.

In summary, when the tape stops, and audio/visual device 12 generates a signal which is fed through the interconnecting cable 11 to turn on the light 50 and at the same time energize the switches 33. When thereafter any of the switches 33 is closed responsive to the scoring of a correct answer, as has previously been described, a signal is generated in the program console which is fed back to the audio/visual device to interrupt the relay 42.

It will be obvious to persons skilled in the art that certain structure and circuit modifications may be made to the preferred embodiment which has been described while continuing to practice the principle of our invention. For instance, the program board 28 and its associated risers 29 could be a panel similar to the faceplate panel 28 which defines a matrix of apertures for *incorrect* answers only. That is, the correct answers would be a continuation of the board so that the stylus would engage the board when a correct answer is scored and pass through the program board for incorrect answers.

Having thus described in detail a preferred embodiment of our invention, it is intended that all equivalent structural modification and circuit changes will be covered as they are embraced within the spirit and scope of the appended claim.

What is claimed is:

1. An instruction system comprising: audio/visual means adapted for communicating instruction to a student in response to a control signal; a perforatable record; a stylus having a constricted point and defining a shoulder spaced from said point; a console including receptacle means for receiving said record and including a faceplate and an under panel each defining a matrix of apertures in register with predetermined locations on said record whereby an aligned pair of said apertures provide a guide for said stylus in perforating said record; and response means for generating said control signal and conducting the same to said audio/visual means in response to the perforation of said record only at selected ones of said locations, said response means including a program board having risers at said selected locations adapted to be engaged by said stylus point after it perforates said record, means for resiliently holding said program panel beneath said opaque panel so that said risers coincide with said selected locations, said resilient holding means moving in the direction of movement of said stylus when the same perforates said record at one of said selected locations, and generator means including switch means engaging said program board holding means for generating said control signal in response to the movement of said holding means when said stylus point engages a riser on said program panel and forces said panel and its associated holding means against the force of said resilient holding means, the shoulder on said stylus limiting insertion thereof by engaging said faceplate panel when said point of said stylus does not engage a riser.

References Cited

UNITED STATES PATENTS

| 2,197,306 | 4/1940 | Ingraham | 35—48 |
|---|---|---|---|
| 2,889,634 | 6/1959 | Bringmann | 35—48 |
| 2,970,385 | 2/1961 | Bringmann | 35—9 |
| 3,141,244 | 7/1964 | Smith | 35—9 |
| 3,177,595 | 4/1965 | Yonker et al. | 35—48 |
| 3,187,443 | 6/1965 | Schure et al. | 35—9 |
| 3,206,871 | 9/1965 | Schure et al. | 35—9 |
| 3,319,359 | 5/1967 | Rosenfield | 35—48 |
| 3,401,470 | 9/1968 | Gaven | 35—9 |

FOREIGN PATENTS 1,417,753 12/1964 France.

EUGENE R. CAPOZIO, Primary Examiner

J. H. WOLFF, Assistant Examiner